US012126078B2

(12) United States Patent
Glogowski

(10) Patent No.: US 12,126,078 B2
(45) Date of Patent: Oct. 22, 2024

(54) OMNIDIRECTIONAL HORIZONTALLY POLARIZED ANTENNA WITH HIGH CURRENT PROTECTION

(71) Applicant: HUBER+SUHNER AG, Herisau (CH)

(72) Inventor: Rafal Glogowski, Warsaw (PL)

(73) Assignee: HUBER+SUHNER AG, Herisau (CH)

( * ) Notice: Subject to any disclaimer, the term of this patent is extended or adjusted under 35 U.S.C. 154(b) by 161 days.

(21) Appl. No.: 17/783,174

(22) PCT Filed: Dec. 10, 2020

(86) PCT No.: PCT/EP2020/085469

§ 371 (c)(1),
(2) Date: Jun. 7, 2022

(87) PCT Pub. No.: WO2021/116265

PCT Pub. Date: Jun. 17, 2021

(65) Prior Publication Data

US 2023/0048585 A1 Feb. 16, 2023

(30) Foreign Application Priority Data

Dec. 10, 2019 (CH) .................................... 01582/19

(51) Int. Cl.
*H01Q 1/48* (2006.01)
*H01Q 13/08* (2006.01)
(Continued)

(52) U.S. Cl.
CPC ............ *H01Q 13/085* (2013.01); *H01Q 1/48* (2013.01); *H01Q 21/205* (2013.01); *H01Q 21/24* (2013.01); *H01Q 21/28* (2013.01)

(58) Field of Classification Search
CPC ...... H01Q 13/085; H01Q 1/48; H01Q 21/205; H01Q 21/24; H01Q 21/28
See application file for complete search history.

(56) References Cited

U.S. PATENT DOCUMENTS 7,310,066 B1 12/2007 Li
7,936,314 B2 5/2011 Kuramoto et al.
(Continued)

FOREIGN PATENT DOCUMENTS

DE 10 2013 012 308 A1 1/2015
EP 2 668 677 B1 10/2018
WO WO 2007/048258 A1 5/2007

OTHER PUBLICATIONS

Simons, R.N., et al., "Radial Microstrip Slotline Feed Network for Circular Mobile Communications Array," Digest of the Antennas and Propagation Society Int'l Symposium, Seattle, WA., Jun. 19-24, 1994, vol. 2. Jun. 19, 1994 (pp. 1024-1027).
(Continued)

*Primary Examiner* — Graham P Smith
(74) *Attorney, Agent, or Firm* — Pauley Erickson & Swanson

(57) ABSTRACT

The disclosure is directed to an antenna assembly (1) comprising a horizontally polarized Vivaldi-type first antenna (5). The first antenna (5) comprises a horizontally polarized first radiator (6) extending in a horizontal plane (xy) having a flower-shaped outline comprising several tapered slots (7) arranged distributed around a radiator center (8). The first radiator (6) is horizontally (xy) extending with respect to the radiator center (8) in an outward direction. In vertical direction (z), the radiator extends by a certain thickness (t). A base plate (9) arranged at a certain distance below the radiator (6) interconnected to the radiator (6) by at least one post (10). A power divider (11) and a feeding stub (12) per tapered slot (7) are arranged between the base plate (9) and the first radiator (6). interconnected to the first radiator (6) for coupling radio signals into the first radiator (6).

21 Claims, 7 Drawing Sheets

(51) Int. Cl.

| | |
|---|---|
| ***H01Q 21/20*** | (2006.01) |
| ***H01Q 21/24*** | (2006.01) |
| ***H01Q 21/28*** | (2006.01) |

(56) References Cited

U.S. PATENT DOCUMENTS

| | | | |
|---|---|---|---|
| 8,860,629 | B2 | 10/2014 | Shtrom et al. |
| 9,209,526 | B2 | 12/2015 | Gao et al. |
| 9,496,624 | B2 | 11/2016 | Juan |
| 9,748,666 | B2 | 8/2017 | Daurer et al. |
| 9,887,708 | B2 | 2/2018 | Hyun et al. |
| 2012/0249392 | A1 | 10/2012 | Wang et al. |
| 2016/0072196 | A1 | 3/2016 | Boyer |
| 2017/0207539 | A1 | 7/2017 | Thiel et al. |
| 2017/0244176 | A1 | 8/2017 | Ming et al. |
| 2017/0358842 | A1 | 12/2017 | Shehan et al. |

OTHER PUBLICATIONS

Kolosowski, W., et al., "The Dielectric-Free Tapered Slot Antennas Array," 9th European Conf. on Wireless Tech, IEEE, Piscataway, NJ, Sep. 10, 2006 (pp. 257-260).

Liu, H., et al., "An Ultra-Wideband Horizontally Polarized Omnidirectional Circular Connected Vivaldi Antenna Array," IEEE Transactions on Antennas and Propagation, IEEE Service Center, Piscataway, NJ., vol. 65, No. 8. Jun. 21, 2017 (pp. 4351-4356).

EPO (Riswijk, NL), English language version of the International Search Report, Form PCT/ISA/210, for International Application PCT/EP2020/085469, May 21, 2021 (5 pages).

OMNIDIRECTIONAL HORIZONTALLY POLARIZED ANTENNA WITH HIGH CURRENT PROTECTION

CROSS REFERENCE TO RELATED APPLICATION

This application is a National Phase filing in the United States, under 35 USC § 371, of PCT International Patent Application PCT/EP2020/085469, filed on 17 Nov. 2020 which claims the priority of Swiss Patent Application CH 01582/19, filed 10 Dec. 2019.

These applications are hereby incorporated by reference herein in their entirety and is made a part hereof, including but not limited to those portions which specifically appear hereinafter.

BACKGROUND OF THE INVENTION

1. Field of the Invention

The present invention relates to an omnidirectional horizontally polarized antenna which offers high current protection and a dual-slant omnidirectional antenna.

2. Discussion of Related Art

Train application antennas with high current protection and an omnidirectional radiation pattern are known from the prior art. An example of such solution was given in WO2007048258A1. An alternative solution was also shown in US20170207539A1. All those antennas have one or more radiating elements with vertical polarization and in some cases the system is supplemented with a GPS receiving antenna.

It is well-known that using dual-polarized radiators can bring significant benefit to MIMO systems. Two classical solutions are to use a combination of vertically and horizontally polarized radiators or to use a dual-slant configuration. It is state of the art to have dual polarized directional radiators and different solutions for these exist.

When it comes to dual polarized omnidirectional radiators, it is easy only to have vertically polarized omnidirectional radiators since any monopole, which due to a rotational symmetry is omnidirectional, can be used. However, horizontal or slant polarized radiators are problematic if one wants them to be omnidirectional and broadband simultaneously. Typical horizontally polarized radiators, such as e.g., loop antennas, are narrowband so a standard solution to provide omnidirectional radiation with horizontal polarization is to use several directional antennas with each of them covering one sector. Such solutions are used in e.g., U.S. Pat. No. 9,209,526B2 where a set of four broadband monopoles are placed on a printed circuit board (PCB) which is placed above a monopole radiator that results in a dual-polarized antenna. The monopole can be also surrounded with dipoles like in the EP2668677B1 where a monopole radiator is surrounded by four separate dipole radiators. Finally, in U.S. Pat. No. 9,748,666B2 a monopole is placed on a bended sheet metal construction which is formed into four Vivaldi antennas. Such configuration used in train application is presented in U.S. Pat. No. 9,496,624B2. Another, narrowband solution with horizontal dipoles and some vertical monopole is in US20160072196A1

A dual vertical/horizontal polarization can be also achieved using only printed radiators. Such a solution is presented is U.S. Pat. No. 8,860,629B2. Another solution with mostly printed elements is in U.S. Pat. No. 7,936,314B2. Another solution is in U.S. Pat. No. 7,310,066B1. In this solution the radiator is only a PCB which is placed horizontally but there are some vertical parts to provide second polarization.

For a dual-slant configuration, the standard solution is also to use several sets of two crossed antennas, each covering a sector. Also, dual-polarized patch antennas can be used for directional dual-slant antennas. Dual slant directional radiator crossed pairs are a standard solution in base station antennas. Such solution is shown e.g., in US20170244176A1. Similar solution is in U.S. Pat. No. 9,887,708B2 and another example is in US20170358842A1.

In case of using several antennas, each covering a sector, a signal dividing/combining element is required. Since for each polarization a separate signal dividing/combining network is required, this solution is complicated to design and manufacture. Another attempt, which is very common in train applications is to take two omnidirectional antennas and mount them on two 45 degrees inclined surfaces. However, the drawback of this attempt is that the real dual slant polarization is only along the top edge of the surface used to mount the antennas. In other directions the polarization is either vertical (perpendicular direction to the top edge) or elliptical with domination of vertical component. Other attempts which are known from literature, are based on single slant omnidirectional antennas. The drawback of all solutions is that they provide only a single slant polarization so a second radiator would be required to provide dual-slant polarization. Using a second radiator usually requires more space, makes the design more complicated, and the second radiator might obstruct field of view of the first radiator in a negative manner.

SUMMARY OF THE INVENTION

Rooftop antennas especially for trains must provide so-called high current protection. This means that in case of a broken catenary line which e.g., touches the antenna, the antenna must be able to short the current to the antenna ground (usually the mounting surface) for at least 125 ms and during this time the voltage on the antenna connector must remain below 50V. It is assumed that after less than 125 ms the protection circuits will kick in and the catenary line will be de-energized. This requires that the radiator is appropriately grounded and has sufficient cross-section as well as ground contact which will be able to carry current up to 40 kA.

Due to the mobile character of rooftop train applications, in most applications an omnidirectional radiation pattern is required to provide the coverage no matter what the mutual position of the train and base station is.

The present disclosure addresses two main aspects. The first one is how to provide a horizontally polarized omnidirectional radiator with high current protection for train applications. In a preferred variation, this radiator is suitable to be used with another, vertically polarized, radiator in order to provide dual polarized train rooftop antenna but could be used alone as well. Up to now, no horizontally polarized radiator with high current protection is known from the prior art. All radiators mentioned above in the section background of the invention, are either not fully grounded or made by using materials like PCB or relatively thin metal which are inappropriate for this application. These materials cannot be used to provide high current protection, where all the exposed parts must be grounded and made out of electrically conductive material (usually metal) that is thick enough to guide in certain variations up to 40 kA of current for at last 125 milliseconds. Therefore, the present disclosure addresses as a first aspect the problem of providing a horizontally polarized omnidirectional radiator which offers high current protection. Depending on the field of application, this radiator can be used together with a vertically polarized omnidirectional radiator with high current protection to provide a dual-polarized antenna with high current protection. If appropriate, the horizontally polarized radiator can be used alone. Furthermore, the horizontally polarized radiator can be used to cover only one or several sectors.

As a second aspect the present disclosure provides a dual slant polarized antenna arrangement with e.g., omnidirectional radiation. While there are numerous examples of dual-polarized vertical-horizontal radiator antennas, there are no omnidirectional dual slant antennas known so far. Since most of the base station antennas use dual slant polarization diversity, a dual-slant antenna would load both channels of a MIMO receiver equally and provide polarization matching which is attractive to increase the throughput. This aspect is addressed by adopting a vertical-horizontal dual-polarized antenna pair into dual slant configuration. It is important to note that the disclosed approach can be used with any pair of vertically/horizontally polarized radiators. However, it can be also used with the antenna proposed above which would result in a dual-slant omnidirectional antenna for train applications, i.e., with high current protection. On top of this, such approach could be applied to directional radiators as well. The proposed approach can be used to obtain dual-slant polarized directional radiators. Therefore, the herein after in more detail presented dual slant polarized antenna arrangement should thus be considered a separate inventive concept, which may be made subject of one or several divisional patent applications.

In a variation of the first aspect, a set of Vivaldi radiators which are made of thick metal is provided in order to provide simultaneously horizontal polarization, omnidirectional patterns, and high current protection. The horizontal polarization with omnidirectional patterns can e.g., be achieved by 3 to 6 Vivaldi antennas arranged in a horizontal plane, evenly distributed around an antenna center point and feeding them by a power divider and thereto interconnected PCB stubs as described hereinafter in more detail. The high current protection is obtained by a radiating element (radiator) which is made of a sufficiently thick plate of conductive material to provide enough volume for conducting high current. The radiating element is placed on one or several sufficiently massive legs, made of a conductive material, which provide distance to a ground plate that is required for efficient horizontally polarized radiation and are able to carry the high current to the ground. A feeding cable is preferably guided behind or through one of the legs e.g., in order to protect it from the contact with the catenary line. If present, a power divider PCB is preferably placed vertically below the radiator such that it is better protected by the massive radiator arranged vertically above. Good results can be achieved, when the feeding cable is guided through a trench in the top of the radiator, so it is not exposed for a contact with the catenary line. Good results can be achieved when a right angle connector, similar to the one proposed in patent application US20170207539A1, is used in order to connect feeding cable and Vivaldi PCB without exposing any “hot” part (e.g., cable or PCB connection interface) to a potential contact with the catenary line.

In a preferred variation, the antenna assembly comprises an omnidirectional horizontally polarized Vivaldi-type first antenna comprising an omnidirectional horizontally polarized first radiator, extending (in a mounted position) in an essentially horizontal plane, having a flower-shaped outline with several leaves separated from each other by several tapered slots which are arranged distributed around a radiator center. Depending on the field of application and the characteristics to be achieved, the number and the arrangement of the tapered slots may vary, e.g., the tapered slots can be designed to provide an oriented characteristic. The tapered slots are preferably extending horizontally with respect to the radiator center in an outward direction. Vertically the tapered slots are usually extending perpendicular to the essentially horizontal plane by a certain thickness. A base plate is usually arranged in general parallel at a certain distance below the radiator which is galvanically interconnected to the radiator by at least one post. Good results can be achieved, when the at least one post is arranged at a leave to which it is e.g., attached by a bolt. The at least one post and the radiator can be made from one piece. A power divider and (per tapered slot) a feeding stub are preferably arranged between the base plate and the first radiator. Depending on the field of application and the design, they can be arranged above the radiator. They are interconnected electromagnetically to the first radiator for coupling radio signals into the first radiator. The first radiator is preferably made at least partially from solid metal, such that it can withstand high current easily as described herein above. Good results can be achieved, when the first radiator is essentially plate-shaped. For omnidirectional radiation, the several tapered slots are preferably arranged evenly distributed around the radiator center. The tapered slots are preferably arranged in radial outward directions with respect to the radiator center. Depending on the field of application, other arrangements are possible. In a preferred variation, the power divider and the feeding stubs are arranged as at least one electrical conductor on a printed circuit board attached to the bottom of the first radiator. In a preferred variation, the power divider has a star like design starting from the center of the radiator and comprising several branches. The feeding stubs are curved in a forward direction from an outer end of each branch and extending across a tapered slot arranged in a coupling distance from each feeding stub and each tapered slot end. The at least one post may be galvanically interconnected to the first radiator suitable to receive a high current from a catenary line of a railway track as mentioned herein above. A feeding cable may extend at least partially through the first radiator. Thereby a compact and robust design with a low overall height may be achieved. The feeding cable can at least partially be arranged in a trench of the first radiator. In a preferred variation, the feeding cable extends at least partially through the at least one post. The feeding cable can be interconnected to the power divider by a connector arranged at least partially in the first radiator. Usually, the connector is arranged in the radiator center. The center conductor of the connector or the center conductor of the feeding cable is preferably soldered or electrically connected by other means to the power divider.

From the prior art no omnidirectional horizontally polarized antennas with radiator high current protection are known. Therefore, the present disclosure is a preferred proposal for train applications if horizontal polarization is desired. By using several sub-radiators, good omnidirectional behavior is achieved while a certain thickness of the cross-sections, which is required for high current protection, is obtained.

With respect to the second aspect of the disclosure, a slant polarization can be generated by adding a vertically polarized radiation to a horizontally polarized radiation. If the amplitudes of V/H polarizations are equal, a 45-degree slant polarization is generated. An orthogonal slant polarization can be generated by applying a 180-degree phase shift to the horizontally polarized component. Thus, if one can have a system with two radiators, one with vertical polarization and one with horizontal polarization, both having similar patterns and gain, and could feed them with signals in which one is divided equally between both radiators and in-phase and a second is divided equally between both radiators but with a horizontal component out of phase (180-degree phase difference), it is possible to generate dual slant, orthogonal polarization. This is achieved by a microwave device comprising a first input and a second input and a first output and a second output. The microwave device providing the following properties:

- The microwave device is splitting between both outputs a first signal received by the first input into two signals exiting at the first and the second output which are equal and in-phase (0-degree phase difference) with respect to each other.
- The microwave device is splitting between both outputs a second signal received by the second input into two signals exiting at the first and the second output which are equal to each other but in counter-phase (i.e., out-of-phase, 180 degrees phase difference),
- The inputs are isolated from each other.
- A microwave device is reciprocal so the signals which are exciting the first and second signal outputs are added in-phase at the first signal input and in counter-phase at the second signal input.

Such properties can be achieved by a so-called rat-race hybrid coupler or a magic-tee hybrid coupler. The rat-race hybrid couplers are parts which can be realized in microstrip or stripline technology while magic-tee hybrid couplers are realized in waveguide technology. Both types of couplers are well-known state-of-the-art microwave devices and are available as off-shelf components or one can easily design own realizations. In a preferred variation a dual polarized vertical/horizontal omnidirectional antenna arrangement is interconnected to such a hybrid coupler. In this way, one hybrid input will generate one slant polarization and the second input will generate an orthogonal slant polarization. This approach can help to solve several problems: If V/H polarized radiators are omnidirectional, a dual-slant omnidirectional antenna can be built which is not possible in any other way then using two single-slant polarized omnidirectional antennas with different senses one next to another. If V/H polarized radiators are directional, this is a way to obtain a dual-slant directional antenna. The advantage of this solution, with respect to simply using two inclined directional radiators, is that in case of a presence of the conductive ground plane, which is attenuating the horizontal component, one can place the horizontally-polarized radiator on top of the vertically-polarized one which will increase the distance of the horizontally polarized radiator to the ground plane, see FIG. 6. In this way, the horizontal component of the slant polarization will be less attenuated by the presence of the ground plane so the slant polarization purity will be better. The antenna can be easily reconfigured to a vertical/horizontal radiator configuration. It is sufficient to just remove the hybrid.

A very simple method was used to obtain dual-slant omnidirectional characteristics, but the effect is surprisingly good and broadband. The currently existing slant omnidirectional antennas are all single-slant and in most cases have complicated geometry. By using a standard component, e.g., rat-race hybrid coupler or magic-tee hybrid coupler, which can be taken as off-shelf components, one can obtain both omnidirectional and dual-slant patterns. According to the best knowledge, such a solution (both omnidirectional and dual-slant) was not yet proposed in the literature. Moreover, it can be applied to the antenna which consists of a standard vertically polarized radiator with high current protection and a horizontally-polarized radiator as proposed above, so a high current protected omnidirectional dual-slant antenna is obtained.

The second aspect of the disclosure can also be applied to directional antennas. The benefit of the proposed solution is that it allows to place the source of the horizontal component of the slant radiation further from a ground plane so better performance will be achieved than for standard solutions when just two radiators are crossed.

The disclosure can e.g., be used in the following fields of application: By the first aspect of the disclosure, a high current protected rooftop antenna for trains or trams with dual polarization and omnidirectional patterns can be achieved. In combination with the second aspect of the disclosure it allows to have dual-slant omnidirectional antennas. Therefore, a dual-slant, omnidirectional, high current protected antenna for train applications can be obtained. The second aspect of the disclosure offers a solution which can be used in combination with any pair of vertical/horizontal polarized radiators with omnidirectional characteristics to obtain a dual-slant polarized omnidirectional radiation. This can be used, for example, in simple base station antennas for small cells or antennas for in-building coverage. The second aspect of the disclosure can be applied to directional radiators. Using vertical and horizontal-polarized radiators instead of two crossed radiators can be beneficial e.g., in train applications where a ground plane is present and strongly attenuates the horizontal component, so it is desired to increase the distance between horizontal component and ground plane as much as possible. Therefore, this is a practical way to obtain a low-profile directional double slant antenna to be placed over conductive surfaces, e.g., a train roof.

If appropriate, the leafs of the first radiator may comprise a secondary slot arranged with respect to the center of the first radiator in a radial direction. This may improve the overall matching of the horizontally polarized radiator. For better performance, the horizontally polarized first antenna may comprise an impedance transformer. The impedance transformer can e.g., be designed as so-called "Klopfenstein transformer". Preferably, the impedance transformer can be realized as PCB line which is printed on a PCB arranged inside a depression in the main radiator. The depression can protect the transformer from high current in case a catenary line will fall down on the radiator while PCB technology allows simple fabrication.

A GPS antenna module can form part of the antenna assembly according to the disclosure. Good results are achieved when the GPS antenna module is arranged on top of the first radiator of the first antenna. The GPS antenna module can be arranged in a depression of the first radiator. The depression of the first radiator can be configured to protect the GPS antenna module from the high current in case a catenary line falls on the radiator.

In a preferred variation, the vertically polarized second radiator of the second antenna is arranged at least partially within the ground plot (when seen from vertically above) of the first radiator of the first antenna. A very space-saving and shallow arrangement can be achieved, when the first radiator comprises a recess, e.g., in the form of a lateral indentation, in which the second radiator is arranged at least partially within the ground plot of the first radiator. Preferably, the recess is designed such that the second radiator is spaced a distance apart from the first radiator by a gap. The gap preferably has an essentially uniform thickness. Good results can be obtained when no post supports the respective leaf with the recess in order not to influence the vertically polarized radiator RF performance. The horizontally polarized first antenna may comprise an impedance transformer. The impedance transformer can be designed as a Klopfenstein transformer. The impedance transformer may be arranged inside a depression of the first radiator where it is protected against high current.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
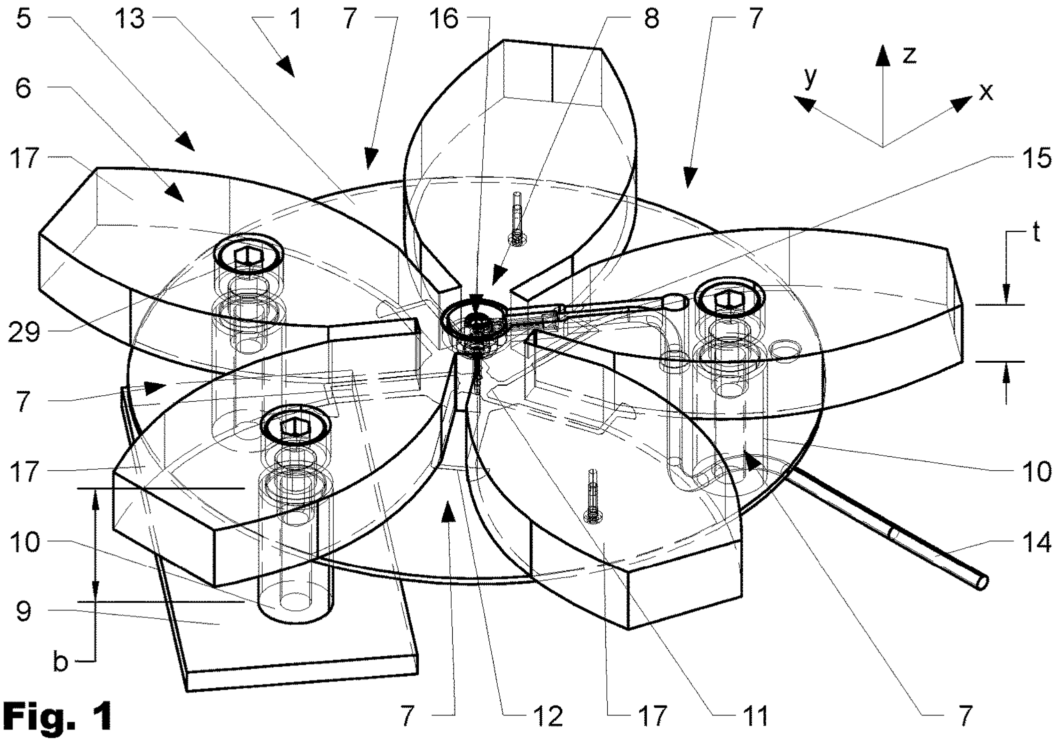
FIG. 1 shows a first antenna in a perspective view.
Figure 2:
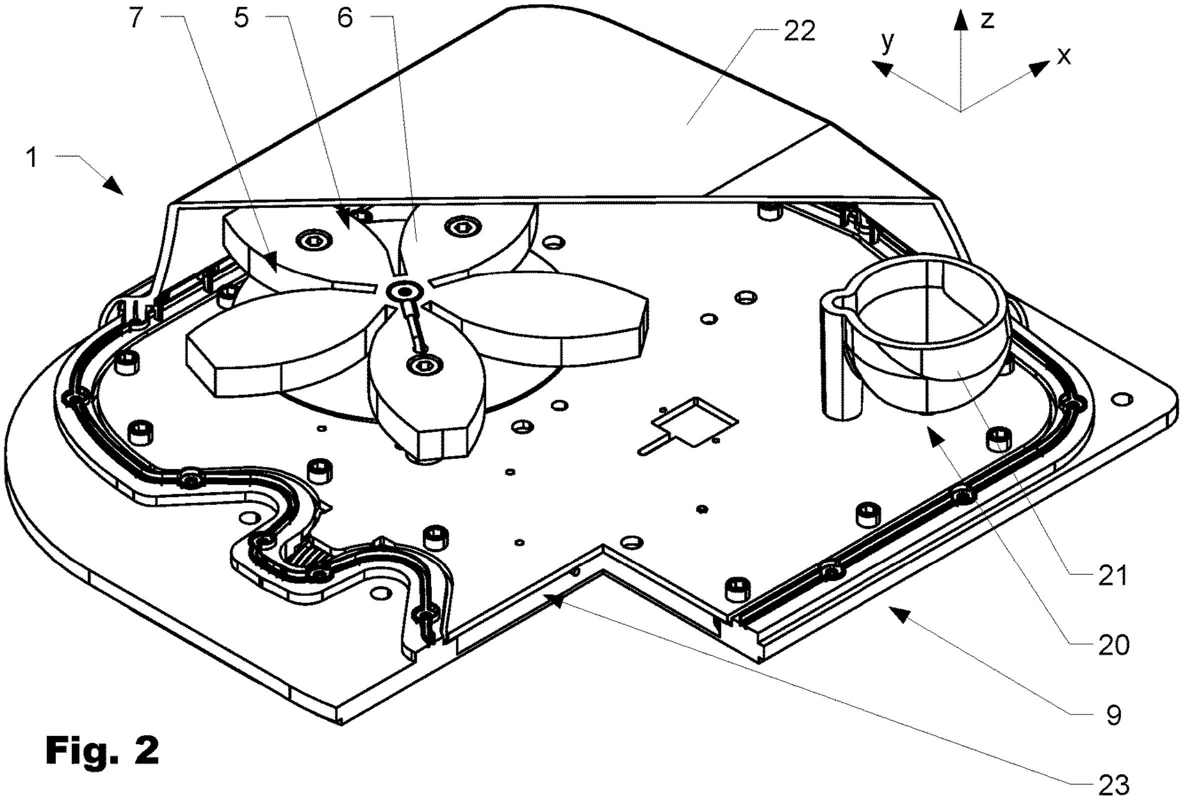
FIG. 2 shows a first variation of an antenna assembly comprising a first and a second antenna in a perspective view and partially sectionized.
Figure 3:
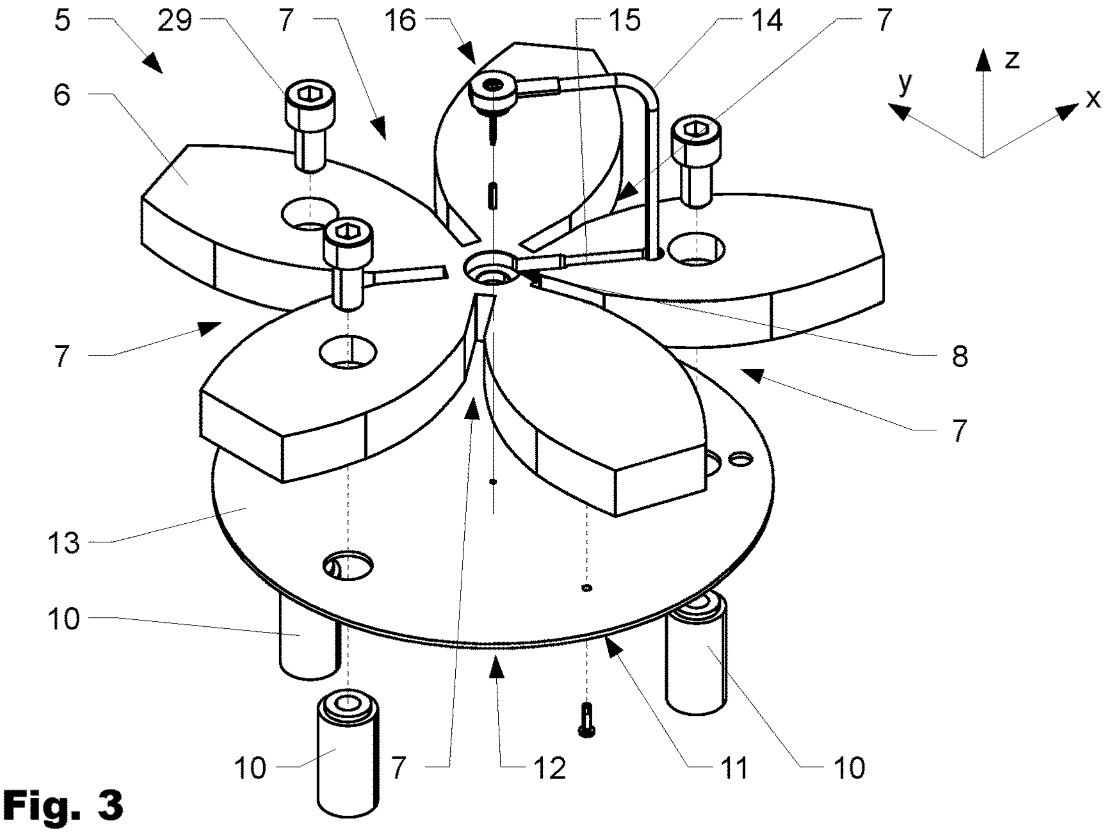
FIG. 3 shows the first antenna in an exploded view from above.
Figure 4:
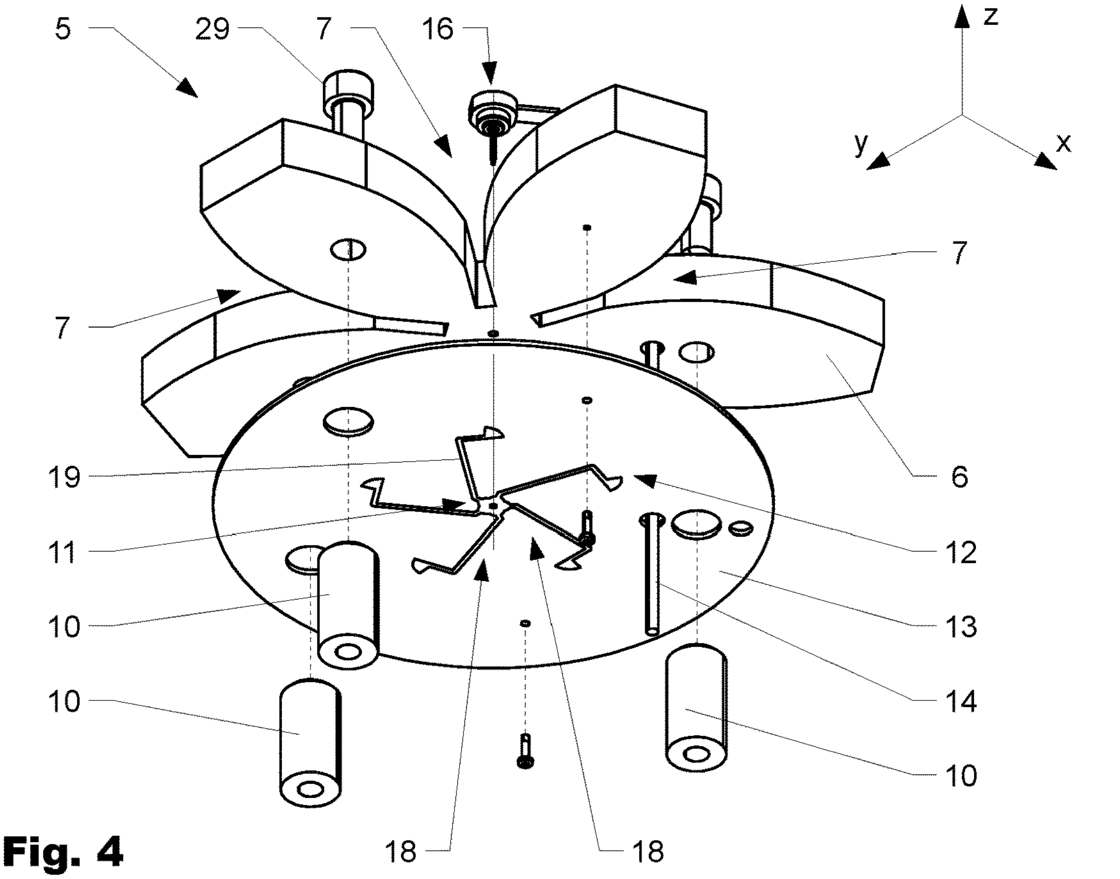
FIG. 4 shows the first antenna in an exploded view from below.
Figure 5:
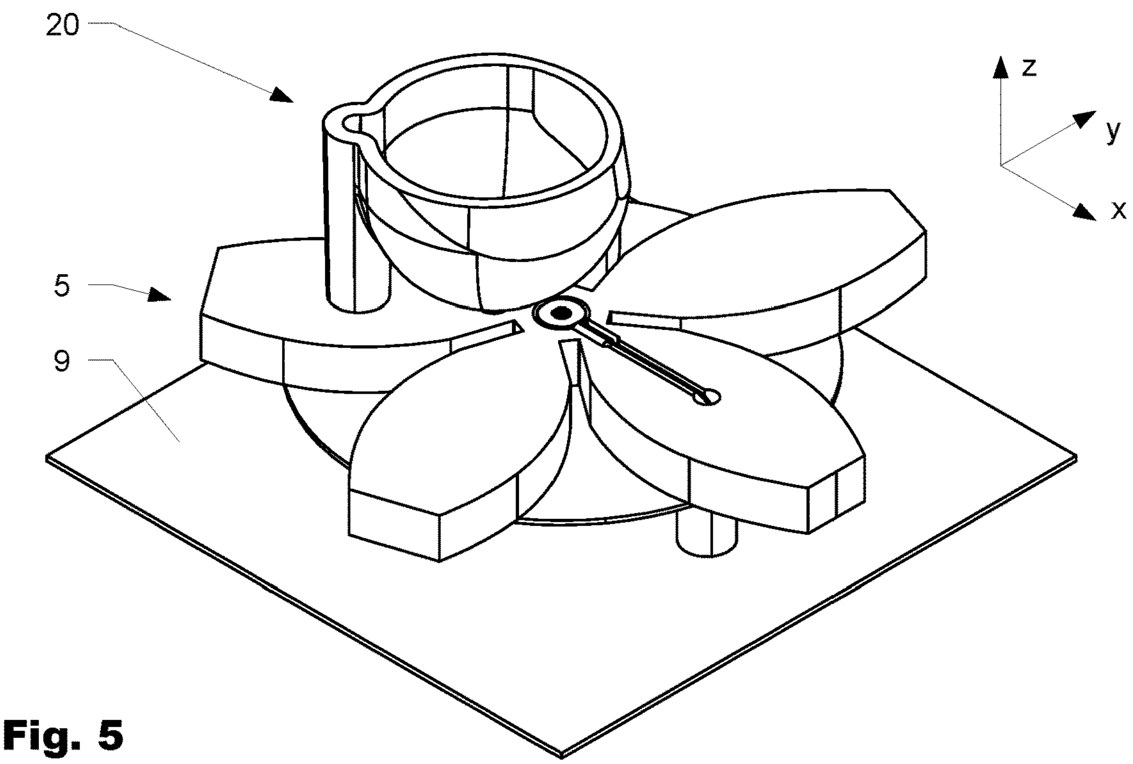
FIG. 5 shows a second variation of an antenna assembly in a perspective view.
Figure 6:
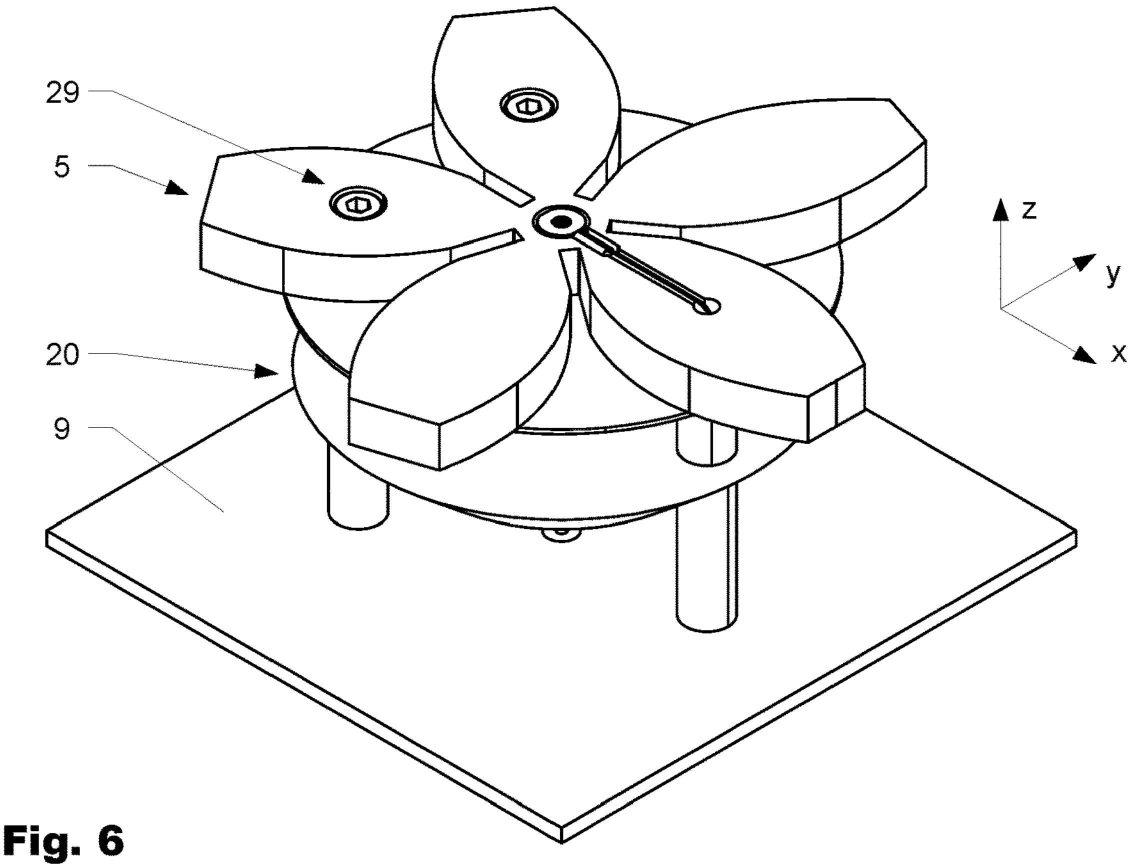
FIG. 6 shows a third variation of an antenna assembly in a perspective view.
Figure 7:
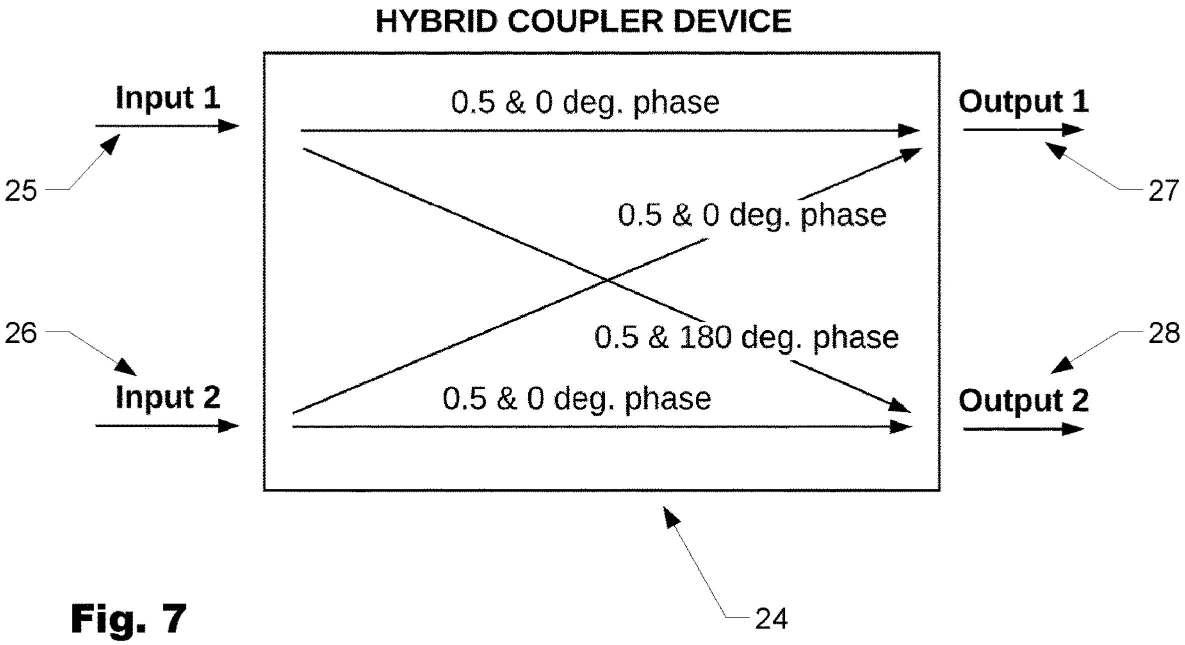
FIG. 7 shows schematically a hybrid coupler device.
Figure 8:
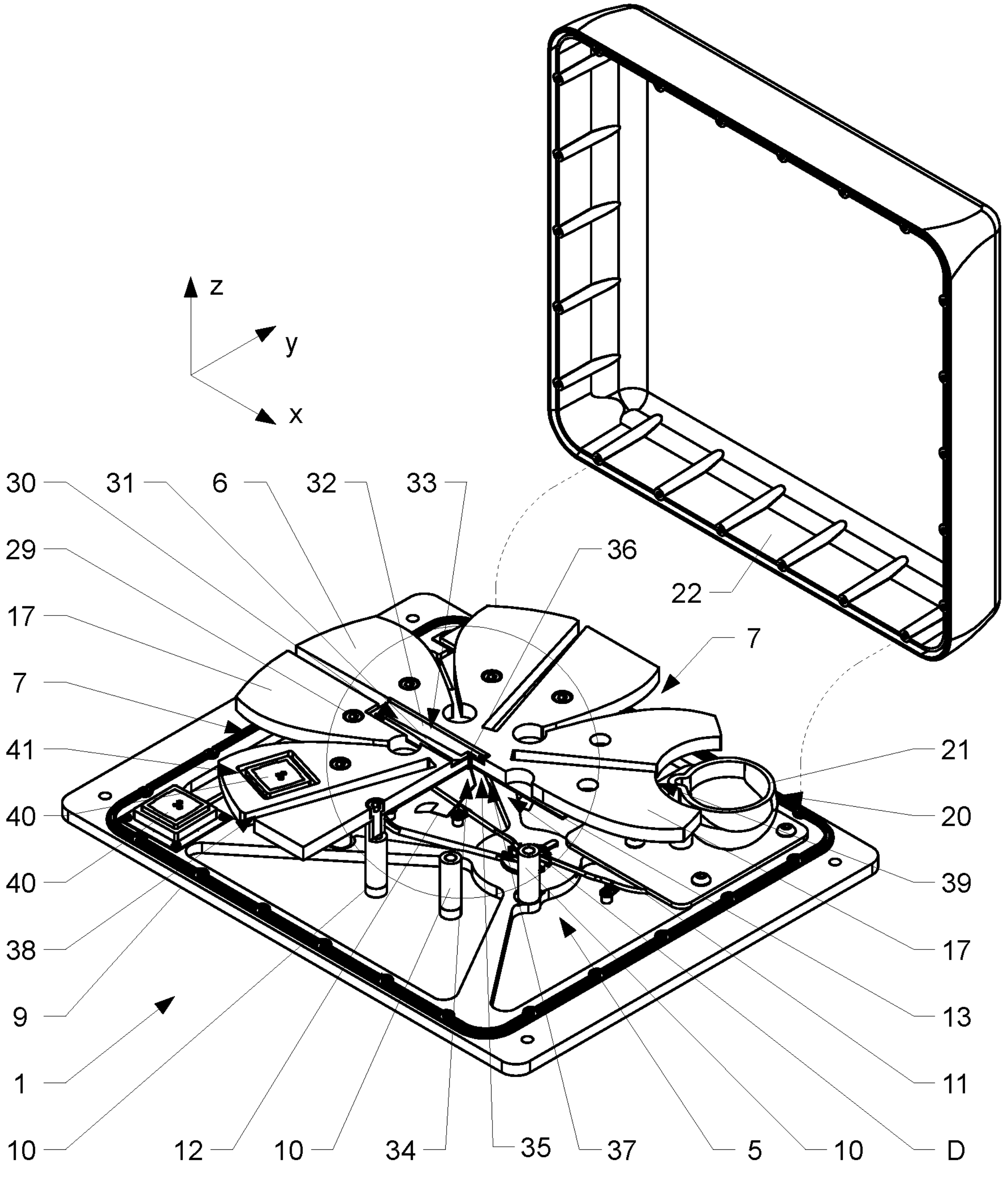
FIG. 8 shows a fourth variation of an antenna assembly in a perspective view.
Figure 9:
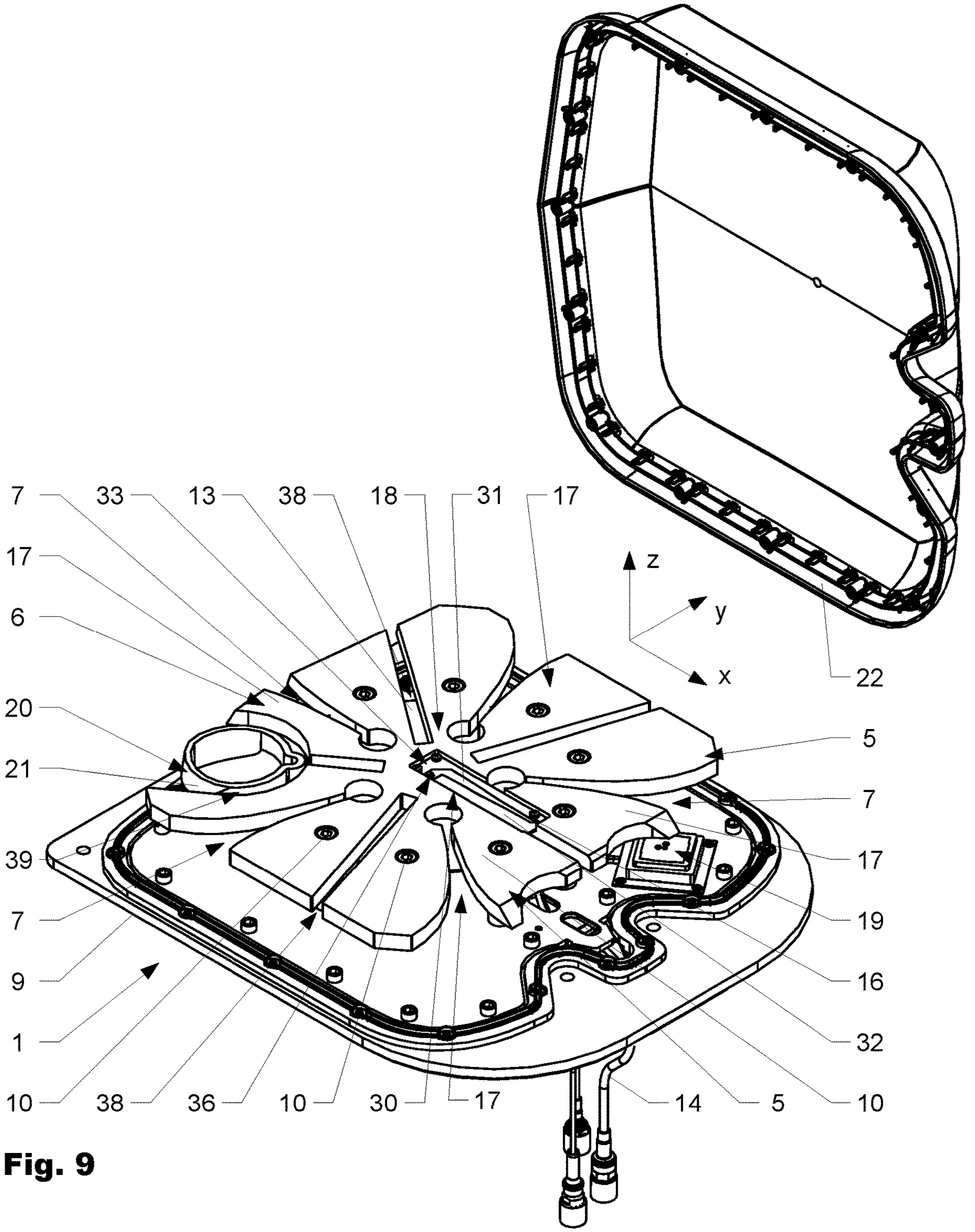
FIG. 9 shows a fifth variation of an antenna assembly in a perspective view.
Figure 10:
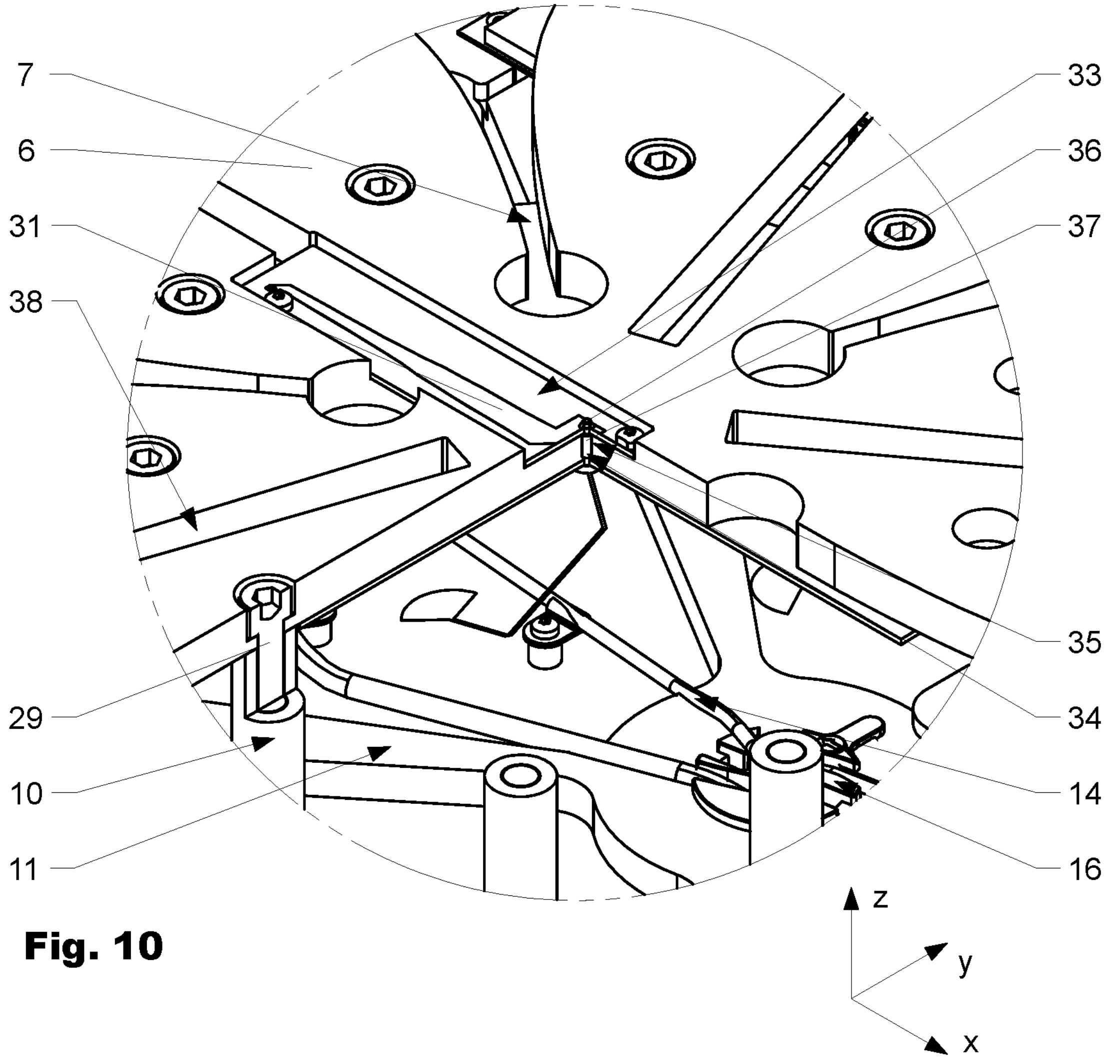
FIG. 10 shows a detailed view of the fourth variation of FIG. 8

FIG. 1 shows a variation of an omnidirectional horizontally polarized Vivaldi-type first antenna 5 in a perspective view. The hidden lines are shown as dashed lines. FIG. 2 shows a first variation of an antenna assembly 1 comprising a first antenna according to FIG. 1. FIG. 3 shows the first antenna 5 according to FIG. 1 in an exploded isometric view from above. FIG. 4 shows the first antenna 5 according to FIG. 1 in an exploded isometric view from below. FIG. 5 shows a second variation of an antenna assembly 1 comprising a first antenna according to FIG. 1. FIG. 6 shows a third variation of an antenna assembly 1 comprising a first antenna according to FIG. 1. FIG. 7 schematically shows a microwave device 24 as used in connection with the second aspect of the disclosure. FIG. 8 shows a fourth variation of the antenna and FIG. 9 shows a fifth variation of the antenna in a perspective manner from the front and above. FIG. 10 shows a sectional view of the fourth variation of the antenna (Detail D).

As e.g., visible in the perspective view of FIG. 1, an antenna assembly 1 according to a first aspect of the disclosure preferably comprises an omnidirectional horizontally polarized Vivaldi-type first antenna 5. The first antenna 5 comprises an omnidirectional horizontally polarized first radiator 6 arranged extending in an essentially horizontal plane (xy-plane) having an essentially flower-shaped outline with several leaves 17 separated from each other by tapered slots 7 arranged distributed around a radiator center 8. The tapered slots 7 are extending horizontally with respect to the radiator center 8 in an outward direction. Vertically, (z-direction) the tapered slots 7 are extending perpendicular to the horizontal plane (xy-plane) by a certain thickness (t). A base plate 9, which in FIG. 1 is only schematically indicated, is arranged in general parallel at a certain distance (b) below the radiator 6 and interconnected to the radiator 6 by at least one post 10. In the variation according to FIG. 1, the at least one post 10 is arranged at a leaf 17 to which it is attached by a bolt 29. A power divider 11 and, per tapered slot 7, a feeding stub 12 are arranged between the base plate 9 and the first radiator 6. They are electromagnetically coupled to the first radiator 6 for coupling radio signals into the first radiator 6. The first radiator 6 is preferably made from solid metal, such that it can withstand high currents easily as described herein above. Good results can be achieved, when the first radiator 6 is essentially plate-shaped as shown in the drawings. If appropriate, the first radiator may comprise at least one recess and/or opening on the inside as long as they do not have a negative impact on the performance. The several tapered slots 7 are preferably arranged evenly distributed around the radiator center 8. The tapered slots 7 are usually arranged in radial outward direction with respect to the radiator center 8. Depending on the field of application, other arrangements are possible as well. In a preferred variation, the power divider 11 and the feeding stubs 12 are arranged as at least one electrical conductor 19 on a printed circuit board 13 attached to the bottom of the first radiator 6. As e.g., visible in FIG. 3 and FIG. 4, the printed circuit board 13 may have a circular shape. Depending on the field of application, other designs are possible.

The at least one post 10 may be electrically galvanically interconnected to the first radiator 6 suitable to receive a high current from a catenary line of a railway track as mentioned herein above. A feeding cable 14 preferably extends at least partially through the first radiator 6. T hereby a compact and robust design with a low overall height may be achieved. The feeding cable 14 can at least partially be arranged in a trench 15 of the first radiator 6, In a preferred variation, the feeding cable 14 extends at least partially through the at least one post 10. The feeding cable 14 can be interconnected to the power divider 11 by a connector 16 arranged at least partially in the first radiator 6, Preferably, the power divider 11 and the feeding stub 12 are arranged as at least one electrical conductor 19 on a printed circuit board 13. Especially with respect to the high current protection, the power divider 11 and the feeding stub 12 are preferably attached to the bottom of the first radiator 6. As shown in the drawings, the power divider 11 may have a star like design starting from the center 8 of the radiator 6 and comprising several branches 18. Good results can be achieved, when the feeding stubs 12 are curved in a forward direction from an outer end of each branch 18 and extending across a tapered slot 7 arranged in a coupling distance from each feeding stub 12 and each tapered slot 7 end. Usually, the connector 16 is arranged in the radiator center 8. Far save connectivity, the connector 16 can be interconnected to the electrical conductor 19 by soldering.

Good results can be achieved, when the first antenna 5 is combined with an omnidirectional vertically polarized second antenna 20 with at least one omnidirectional vertically polarized second radiator 21. Preferably, the second radiator 21 is arranged on the same base plate 9 as the first radiator 6. In a preferred variation, the second radiator 21 is cup-shaped. Depending on the field of application, different arrangements are possible: The second radiator 21 can be arranged vertically above and/or below and/or horizontally next to the first radiator 6. The base plate 9 may encompass a hollow space suitable to receive a cabling for the several elements of the antenna assembly 1. To obtain a dual slant antenna, the first 5 and the second antenna 20 may be interconnected to each other by microwave device as schematically shown in FIG. 7. Good results can be achieved by a microwave device 24 in form of a rat-race hybrid coupler and/or a magic-tee hybrid coupler.

In the fourth variation according to FIG. 8 and FIG. 10 and fifth variation according to FIG. 9 of the antenna assembly 1 both horizontally as well as vertically polarized first and second antennas 5, 20 are integrated. In comparison to the variations described above, the first antennas 5 are considerably bigger to also cover low frequency bands, such as e.g., 5G 700 MHZ band. The housings 22 are shown in an unfolded state above the base plate 9. In FIG. 8, the first radiator 6, the printed circuit board 13, as well as certain posts 10 in the front of the drawing are shown in a section view to offer better visibility on the structure underneath. The feeding stub 12 which is normally arranged underneath the printer circuit board 13 is shown uncut.

Each first radiator 6 is preferably fed using an electric conductor 19 in the form of a microstrip line 19, which is printed on the printed circuit board 13 which is placed on the bottom side of the Vivaldi radiator 6. The microstrip lines 19 are fed using a power divider/combiner 11 as mentioned herein above in more detail. The power divider 11 input is connected to a feeding cable 14, which in the shown variation is embedded inside the Vivaldi radiator 6. The feeding cable 14 is not directly connected to the power divider 11 on the bottom side of the first radiator 6. Instead, it is first connected by a coaxial connector 16 to an impedance transformer 30. As best visible in FIG. 10, in the shown variation, the impedance transformer 30 is designed as an electric conductor 31 arranged on a printed circuit board 32 which is arranged in a depression 33 on the upper side of the first radiator 6. In the center area of the first radiator 6 the impedance transformer 30 is interconnected to the power divider 11 arranged on the bottom side of the first radiator 6 by a connector 34 arranged in a bore 35 of the first radiator 6. The connector 34 comprises a connection pin 36 surrounded by a sleeve 37 made from a dielectric material. The advantage of an impedance transformer 30 is that the input impedance of the power divider 11 is comparatively low (in the range of 20-30 Ohm) due to the fact that several Vivaldi feeding stubs 12, in the shown variation five, are connected in parallel to the power divider 18 output. Also, the connection pin 34 and the sleeve 35 arranged inside the Vivaldi radiator 6 are preferably matched to this low impedance. The impedance transformer 30 is preferably adapted to the standard 50 Ohm impedance which is used in the coaxial adapter and coaxial cable. Good results can be achieved when the impedance transformer 30 is designed as so-called "Klopfenstein transformer". However, any other design of impedance transformer (quarter-wavelength, multi-section, Chebyshev, maximally-flat, exponential, etc.) would be applicable if it fulfills performance and bandwidth requirements.

In the "leafs" of the first radiator 6 additional secondary slots 38 are integrated in order to mitigate the mutual coupling between single, neighboring first radiators 6. The secondary slots extend in radial direction with respect to the center 8 of the first radiator 6. This may improve the overall matching of the horizontally polarized radiator.

To safe space the vertically polarized second radiator 21 of the second antenna 20 is arranged at least partially within the ground plot of the first radiator 6 of the first antenna 5. In view of the often limited height and the need to eliminate the detuning of the vertically polarized radiator by the proximity of the Vivaldi first radiator leafs 17, the herein shown fourth and fifth variations comprise a recess 39 in at least one leaf 17. The recess 39 is designed such that it is spaced a distance apart from the cup-shaped second radiator 21. Good results can be obtained when no post 10 supports the respective leaf 17 with the recess 39 in order not to influence the vertically polarized radiator RF performance.

If appropriate a GPS antenna module 40 can be integrated in the antenna assembly 1. In the shown variation, there are two possible options for positioning the GPS antenna module 40. It can be either integrated in the antenna baseplate 9 or in a respective recess 41 in a leaf 17 of the first radiator 6. Integrating the GPS antenna module in the baseplate 9 is simpler from the mechanical point of view but some part of the module field of view is covered by the other elements. This might limit the GPS signal reception performance. An alternative solution is to mount the GPS antenna module 40 at less restricted position. The GPS antenna module 40 is preferably arranged such that it does not protrude above the top surface of first radiator 6. This is still to provide high current protection to the GPS antenna module 40. If the top surface of GPS antenna module 40 is below the top surface of the first radiator 6, a damaged catenary line will stop on the first radiator 6 which is well grounded as described above.

The variation according to FIG. 9 is optimized to fit an existing antenna platform. The horizontally polarized first radiator 6 is adjusted in order to fit into a smaller housing 22. Therefore, some sections of the Vivaldi radiator leafs 17 have been removed. Also, the height of the posts 10 was reduced. The resulting antenna assembly 1 is more compact and uses existing elements.

The words used in the specification are words of description rather than limitation, and it is understood that various changes may be made without departing from the spirit and scope of the invention.

The invention claimed is:

1. An antenna assembly (1) comprising:

a. a horizontally polarized Vivaldi-type first antenna (5) comprising a horizontally polarized first radiator (6)

extending in a horizontal plane (xy) having a flower-shaped outline comprising several tapered slots (7) arranged distributed around a radiator center (8) and
  i. horizontally (xy) extending with respect to the radiator center (8) in an outward direction and
  ii. vertically (z) extending perpendicular to the horizontal plane (xy) by a certain thickness (t),
b. a base plate (9) arranged at a certain distance below the first radiator (6) interconnected to the first radiator (6) by at least one post (10); and
c. a power divider (11) and a feeding stub (12) per tapered slot (7) are arranged between the base plate (9) and the first radiator (6), interconnected to the first radiator (6) for coupling radio signals into the first radiator (6).

2. The antenna assembly (1) according to claim 1, wherein the first radiator (6) is made from solid metal.

3. The antenna assembly (1) according to claim 1, wherein the first radiator (6) is essentially plate-shaped.

4. The antenna assembly (1) according to claim 1, wherein the first radiator (6) is designed omnidirectional.

5. The antenna assembly (1) according to claim 1, wherein the several tapered slots (7) are arranged evenly distributed around the radiator center (8).

6. The antenna assembly (1) according to claim 1, wherein the tapered slots (7) are arranged in radial outward directions with respect to the radiator center (8).

7. The antenna assembly (1) according to claim 1, wherein the power divider (11) and the feeding stub (12) are arranged as at least one electrical conductor (19) on a printed circuit board (13).

8. The antenna assembly (1) according to claim 1, wherein the power divider (11) and the feeding stub (12) are attached to the bottom of the first radiator (6).

9. The antenna assembly (1) according to claim 1, wherein the power divider (11) has a star like design starting from the radiator center (8) of the first radiator (6) and comprising several branches (18) and wherein the feeding stubs (12) are curved in a forward direction from an outer end of each branch (18) and extend across a tapered slot (7) arranged in a coupling distance from each feeding stub (12).

10. The antenna assembly (1) according to claim 1, wherein the at least one post (10) is electrically galvanically interconnected to the first radiator (6) suitable to receive a high current from a catenary line of a railway track.

11. The antenna assembly (1) according to claim 1, wherein a feeding cable (14) extends at least partially through the first radiator (6).

12. The antenna assembly (1) according to claim 11, wherein the feeding cable (14) is arranged at least partially in a trench (15) of the first radiator (6).

13. The antenna assembly (1) according to claim 1, wherein a feeding cable (14) extends at least partially through the at least one post (10).

14. The antenna assembly (1) according to claim 11, wherein the feeding cable (14) is interconnected to the power divider (11) by a connector (16) arranged at least partially in the first radiator (6).

15. The antenna assembly (1) according to claim 14, wherein the connector (16) is arranged in the radiator center (8).

16. The antenna assembly (1) according to claim 1, wherein the base plate (9) encompasses a hollow space (22).

17. The antenna assembly (1) according to claim 1, comprising an omnidirectional vertically polarized second antenna (20) with at least one omnidirectional vertically polarized second radiator (21).

18. The antenna assembly (1) according to claim 17, wherein the second radiator (21) is cup-shaped.

19. The antenna assembly (1) according to claim 17, wherein the second radiator (21) is arranged vertically above and/or below and/or horizontally next to the first radiator (6).

20. The antenna assembly (1) according to claim 17, wherein the second radiator (21) is arranged on the same base plate (9) as the first radiator (6).

21. The antenna assembly (1) according to claim 17, wherein the first and the second antenna (5, 20) are interconnected to each other by a rat-race hybrid coupler and/or a magic-tee hybrid coupler.

* * * * *